(12) United States Patent
Schmidt et al.

(10) Patent No.: US 9,531,211 B2
(45) Date of Patent: Dec. 27, 2016

(54) METHOD FOR CHARGING AN INTERMEDIATE CIRCUIT CAPACITOR

(75) Inventors: Ralph Schmidt, Weinstadt (DE); Stefan Butzmann, Beilstein (DE); Holger Fink, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 428 days.

(21) Appl. No.: 13/979,239

(22) PCT Filed: Nov. 17, 2011

(86) PCT No.: PCT/EP2011/070350
§ 371 (c)(1),
(2), (4) Date: Oct. 29, 2013

(87) PCT Pub. No.: WO2012/095209
PCT Pub. Date: Jul. 19, 2012

(65) Prior Publication Data
US 2014/0042937 A1    Feb. 13, 2014

(30) Foreign Application Priority Data
Jan. 13, 2011   (DE) .................. 10 2011 002 608

(51) Int. Cl.
*H02P 1/00* (2006.01)
*H02J 7/00* (2006.01)
(Continued)

(52) U.S. Cl.
CPC .......... *H02J 7/0065* (2013.01); *B60L 11/1803* (2013.01); *H02J 7/0013* (2013.01);
(Continued)

(58) Field of Classification Search
CPC .. Y02T 10/7005; Y02T 10/7077; Y02T 10/70; B60W 10/08; B60W 20/00
(Continued)

(56) References Cited

U.S. PATENT DOCUMENTS 5,650,713 A * 7/1997 Takeuchi et al. ............... 322/16
5,898,291 A    4/1999 Hall
(Continued)

FOREIGN PATENT DOCUMENTS

DE         102 54 411 A1    6/2003
DE    10 2009 000 674 A1    8/2010

OTHER PUBLICATIONS

International Search Report corresponding to PCT Application No. PCT/EP2011/070350, mailed Jan. 28, 2013 (German and English language document) (7 pages).
(Continued)

*Primary Examiner* — Eduardo Colon Santana
*Assistant Examiner* — Gabriel Agared
(74) *Attorney, Agent, or Firm* — Maginot, Moore & Beck LLP

(57) ABSTRACT

The disclosure relates to a method for charging an intermediate circuit capacitor in an electric drive unit comprising an electric motor. The intermediate circuit capacitor is charged by an intermediate circuit current that is supplied by a battery. The output voltage of the battery is settable to one or more voltage values. A target value of the intermediate circuit current is determined, and an actual value of the intermediate circuit current is ascertained. The actual value of the intermediate circuit current is then compared with the target value of the intermediate circuit current. An optimal output voltage of the battery is determined on the basis of the comparison of the actual value of the intermediate circuit current with the target value of the intermediate circuit current. Then, the optimal output voltage of the battery is set.

9 Claims, 8 Drawing Sheets

(51) Int. Cl.
    *B60L 11/18*     (2006.01)
    *H02J 7/34*     (2006.01)

(52) U.S. Cl.
    CPC ........... *H02J 7/345* (2013.01); *Y02T 10/7005* (2013.01); *Y02T 10/7055* (2013.01); *Y02T 10/7258* (2013.01)

(58) Field of Classification Search
    USPC .......................................................... 318/139
    See application file for complete search history.

(56) References Cited

U.S. PATENT DOCUMENTS

| | | |
|---|---|---|
| 6,075,331 A | 6/2000 | Ando et al. |
| 2003/0107352 A1* | 6/2003 | Downer et al. .................. 322/40 |
| 2009/0167234 A1* | 7/2009 | Uechi ............................ 318/800 |
| 2009/0315518 A1* | 12/2009 | Soma et al. .................. 320/134 |

OTHER PUBLICATIONS

Blewitt et al.; Approach to low-cost prevention of DC injection in transformerless grid connected inverters; IET Power Electronics; 2010; pp. 111-119; vol. 3, Issue 1.

\* cited by examiner

METHOD FOR CHARGING AN INTERMEDIATE CIRCUIT CAPACITOR

This application is a 35 U.S.C. § 371 National Stage Application of PCT/EP2011/070350, filed on Nov. 17, 2011, which claims the benefit of priority to Serial No. DE 10 2011 002 608.8, filed on Jan. 13, 2011 in Germany, the disclosures of which are incorporated herein by reference in their entirety.

The present disclosure relates to a method for charging an intermediate circuit capacitor in an electric drive unit with an electric motor and a control device for implementing the method according to the disclosure.

BACKGROUND

It would appear that in the future battery systems will be used increasingly both in stationary applications and in vehicles such as hybrid and electric vehicles. In order to be able to meet requirements set for a respective application in respect of voltage and available power, a high number of battery cells are connected in series. Since the current provided by such a battery needs to flow through all of the battery cells and a battery cell can only conduct a limited current, additional battery cells are often connected in parallel in order to increase the maximum current. This can be provided either by providing a plurality of cell coils within a battery cell housing or by external interconnection of battery cells. However, it is problematic that compensation currents between the battery cells connected in parallel may arise owing to cell capacitances and voltages which are not exactly identical.

The basic circuit diagram of a conventional electric drive unit, as is used, for example, in electric and hybrid vehicles or else in stationary applications such as in the rotor blade adjustment of wind energy installations, is illustrated in FIG. 1. A battery 10 is connected to a DC voltage intermediate circuit, which is buffered by an intermediate circuit capacitor 11. A pulse-operated inverter 12, which provides sinusoidal voltages which are phase-shifted with respect to one another for the operation of an electric drive motor 13 via in each case two switchable semiconductor valves and two diodes at three outputs, is connected to the DC voltage intermediate circuit. The capacitance of the intermediate circuit capacitor 11 needs to be high enough for the voltage in the DC voltage intermediate circuit to be stabilized for a period of time in which one of the switchable semiconductor valves is switched on. In a practical application such as an electric vehicle, a high capacitance in the mF range results.

FIG. 2 shows the battery 10 shown in FIG. 1 in a more detailed block circuit diagram. A large number of battery cells are connected in series and optionally additionally in parallel in order to achieve a high output voltage and battery capacity desired for a respective application. A charging and isolating device is connected between the positive pole of the battery cells and a positive battery terminal 14. Optionally, in addition an isolating device 17 can be connected between the negative pole of the battery cells and a negative battery terminal 15. The isolating and charging device 16 and the isolating device 17 each comprise a contactor 18 and 19, respectively, which are provided for isolating the battery cells from the battery terminals 14, 15 in order to switch said battery terminals to be voltage-free. Owing to the high DC voltage of the series-connected battery cells, there is otherwise a considerable potential risk for maintenance personnel or the like. In addition, a charging contactor 20 with a charging resistor 21 connected in series with the charging contactor 20 is provided in the charging and isolating device 16.

The charging resistor 21 limits a charging current for the intermediate circuit capacitor 11 if the battery is connected to the DC voltage intermediate circuit. For this purpose, first the contactor 18 is left open and only the charging contactor 20 is closed. If the voltage at the positive battery terminal 14 reaches the voltage of the battery cells, the contactor 18 can be closed and possibly the charging contactor 20 can be opened.

The charging contactor 20 and the charging resistor 21 represent significant extra complexity in applications which have a power in the region of a few 10 kW, with this extra complexity being required only for the charging operation of the DC voltage intermediate circuit which lasts a few hundred milliseconds. Said components are not only expensive but are also large and heavy, which is particularly disruptive for the use in mobile applications such as electric motor vehicles.

SUMMARY

According to the disclosure, a method for charging an intermediate circuit capacitor in an electric drive unit with an electric motor is provided. The intermediate circuit capacitor is charged by an intermediate circuit current, which is provided by a battery, whose output voltage can be adjusted to one of a plurality of voltage values. The available voltage values may also be temporally averaged voltage values which are generated by the use of known modulation methods, for example pulse width modulation. The method is characterized by the fact that, first, a setpoint value of the intermediate circuit current is fixed and an actual value for the intermediate circuit current is determined. Then, the actual value for the intermediate circuit current is compared with the setpoint value for the intermediate circuit current. On the basis of this comparison, an optimum output voltage for the battery is determined, which output voltage is suitable for favorably influencing the development of the intermediate circuit current over time. This optimum output voltage of the battery is finally adjusted. The provided method has the advantage that it manages without any charging switches and charging resistor, which are expensive, large and heavy.

It is preferred that the method is implemented using a first controller. A controller continuously compares a signal of a setpoint value with a measured actual value for the controlled variable within a control loop and determines, from the difference between the two variables, which is referred to as the control difference, a manipulated variable which influences a controlled system to the extent that the control difference is minimized. In the present case, the control difference of the first controller is provided by the difference between the actual value and the setpoint value for the intermediate circuit current, while the manipulated variable is provided by the optimum output voltage of the battery. In the specific configuration of the first controller, recourse can be made to the embodiments known from the prior art. For example, the first controller can contain a proportional component, an integrating component and/or a differentiating component of the amplification. The configuration in the form of a two-state controller is also possible.

The setpoint value for the intermediate circuit current can be fixed on the basis of a comparison of an actual value for an intermediate circuit voltage which is present at the intermediate circuit capacitor with a setpoint value for the intermediate circuit voltage. In this case, preferably a second controller is used, in which the control difference is provided by the difference between the actual value and the setpoint value for the intermediate circuit voltage and the manipulated variable is provided by the setpoint value for the intermediate circuit current. The second controller can also have any desired configuration in a similar way to the first. The use of the second controller makes it possible for the intermediate circuit voltage to also be freely selectable and for it to be adjusted to different values, for example in different driving situations in an electric vehicle. This can be adjusted continuously by the second controller.

It is also preferred that the intermediate circuit capacitor is charged via an inductance. As a result, a smoothing low-pass filter effect is achieved, with the result that the intermediate circuit current is not subjected to any abrupt changes.

In a preferred embodiment of the disclosure, the battery comprises at least one battery module string with a plurality of battery modules connected in series. Each battery module comprises at least one battery cell and a coupling unit. The at least one battery cell is connected between a first input and a second input of the coupling unit. The coupling unit is designed to connect the at least one battery cell between a first terminal of the battery module and a second terminal of the battery module in response to a first control signal and to connect the first terminal to the second terminal in response to a second control signal. As a result, the output voltage of the battery is adjustable stepwise.

By virtue of the use of the coupling device, battery cells of each battery module can either additively contribute to the output voltage of the battery or can be bridged, with the result that the battery cells of the battery module do not contribute to the output voltage of the battery. By varying the time interval in which a battery module is in one of the two states within a specific period duration, each battery module voltage can be adjusted between zero volt and the maximum module voltage when averaged over time. For this, known modulation methods, such as pulse width modulation, for example, can be used. The output voltage of the battery can thus be adjusted continuously from zero volt (if all of the coupling units are connected in such a way that the battery cells are bridged) up to a maximum output voltage (if all of the coupling units are connected in such a way that the cells of the battery modules additively contribute to the total voltage of the battery).

A further aspect of the disclosure relates to a control unit which is designed to determine an actual value for an intermediate circuit current, by means of which an intermediate circuit capacitor in a drive unit with an electric motor is charged. In addition, the control unit is designed to adjust an output voltage of a battery to one of a plurality of voltage values. The control unit is designed to implement the method according to the disclosure. The control unit can be part of a battery, whose output voltage can be adjusted to one of a plurality of voltage values. The battery is preferably a lithium-ion battery. It is preferred here that the battery comprises the described battery modules with coupling units, as a result of which the output voltage of the battery is adjustable stepwise.

The control unit can likewise be part of a drive unit with an electric motor.

A further aspect of the disclosure relates to a motor vehicle with a drive unit according to the disclosure for driving the motor vehicle.

BRIEF DESCRIPTION OF THE DRAWINGS

Exemplary embodiments of the disclosure will be explained in more detail with reference to the drawings and the description below. In the drawings.

DETAILED DESCRIPTION

Figure 3:
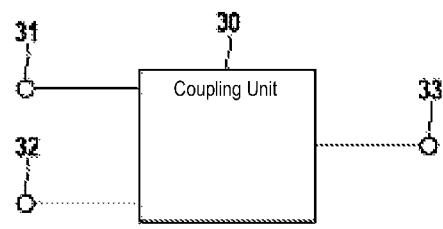
FIG. 3 shows a coupling unit which can be used in a method according to the disclosure.

FIG. 3 shows a coupling unit 30, which can be used in a method according to the disclosure. The coupling unit 30 has two inputs 31 and 32 and an output 33 and is designed to connect one of the inputs 31 or 32 to the output 33 and to decouple the other. In specific embodiments of the coupling unit, said coupling unit can also be designed to disconnect both inputs 31, 32 from the output 33. However, no provision is made for both the input 31 and the input 32 to be connected to the output 33.

Figure 4:
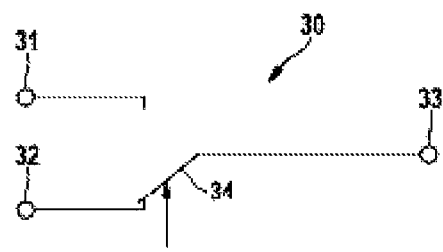
FIG. 4 shows a first embodiment of the coupling unit.

FIG. 4 shows a first embodiment of the coupling unit 30, which has an inverter 34 which can in principle only connect one of the two inputs 31, 32 to the output 33, while the respective other input 31, 32 is decoupled from the output 33. The inverter 34 can have a particularly simple realization as an electromechanical switch.

Figure 5:
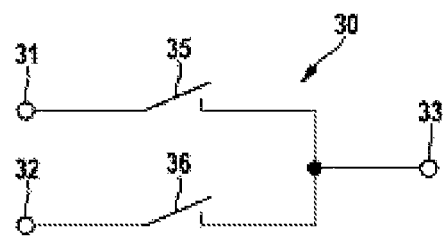
FIG. 5 shows a second embodiment of the coupling unit.

FIG. 5 shows a second embodiment of the coupling unit 30, in which a first and a second switch 35 and 36 are provided. Each of the switches is connected between one of the inputs 31 and 32 and the output 33. In contrast to the embodiment shown in FIG. 4, this embodiment has the advantage that both inputs 31, 32 can also be decoupled from the output 33, with the result that the output 33 will have a high resistance. In addition, the switches 35, 36 can be implemented simply as semiconductor switches such as metal-oxide semiconductor field-effect transistors (MOSFETs) or insulated gate bipolar transistors (IGBTs), for example. Semiconductor switches have the advantage of a favorable price and a high switching speed, with the result that the coupling unit 30 can respond to a control signal or a change in the control signal within a short period of time and high switchover rates can be achieved.

Figure 6:
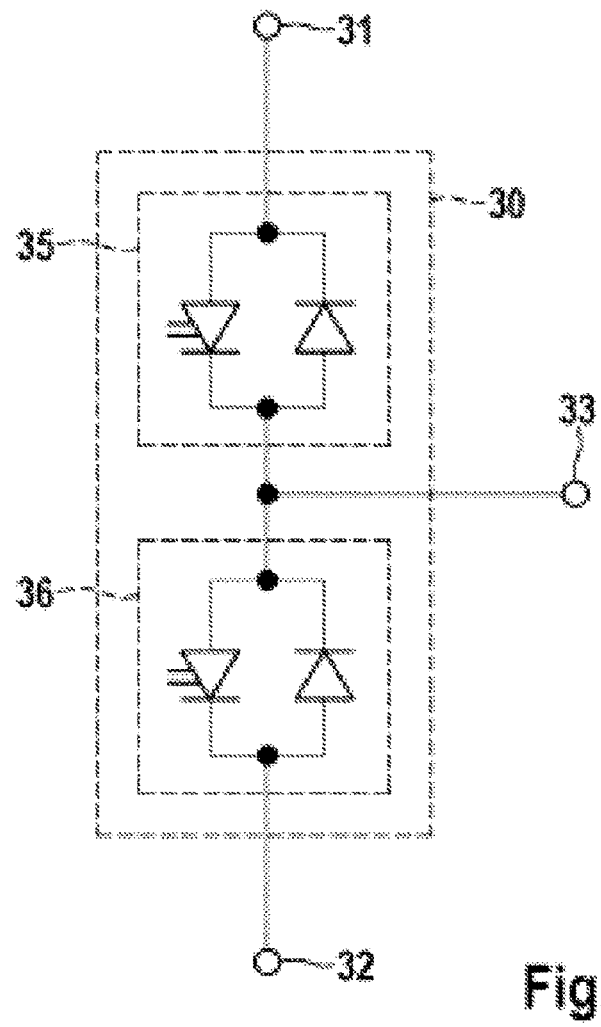
FIG. 6 shows the second embodiment of the coupling unit in a simple semiconductor circuit.

FIG. 6 shows the second embodiment of the coupling unit in a simple semiconductor circuit, in which each of the switches 35, 36 comprises in each case one semiconductor valve which can be switched on and off and one diode which is connected in parallel therewith.

Figure 7:
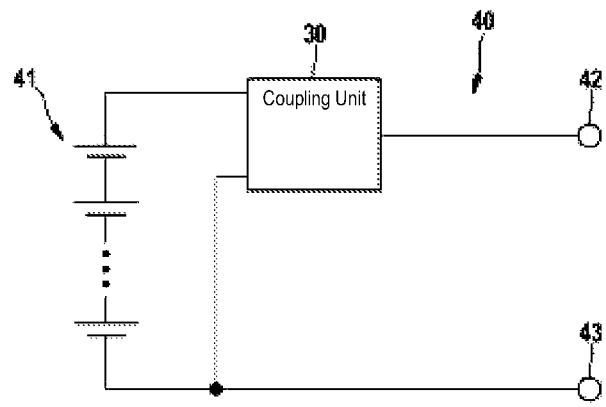
FIGS. 7 and 8 show two arrangements of the coupling unit in a battery module.
Figure 8:
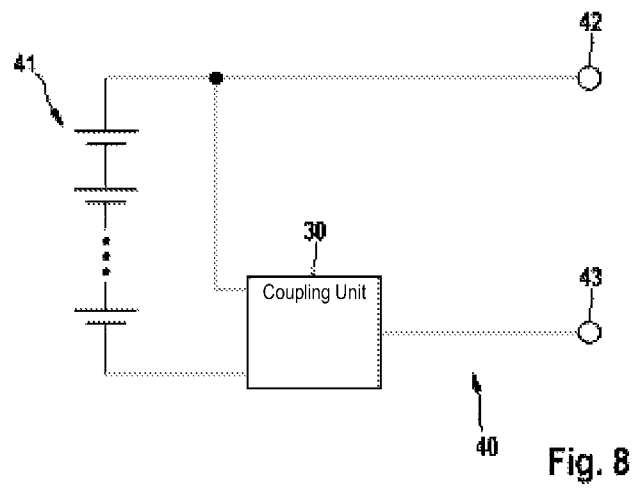

FIGS. 7 and 8 show two arrangements of the coupling unit 30 in a battery module 40. A plurality of battery cells 41 is connected in series between the inputs of a coupling unit 30. However, the disclosure is not restricted to such a series circuit comprising battery cells; it is also possible for only one individual battery cell to be provided or else a parallel circuit or a mixed series and parallel circuit of battery cells. In the example shown in FIG. 7, the output of the coupling unit 30 is connected to a first terminal 42 and the negative pole of the battery cells 41 is connected to a second terminal 43. However, a minor-image arrangement as in FIG. 8 is possible, in which the positive pole of the battery cells 41 is connected to the first terminal 42 and the output of the coupling unit 30 is connected to the second terminal 43.

Figure 9:
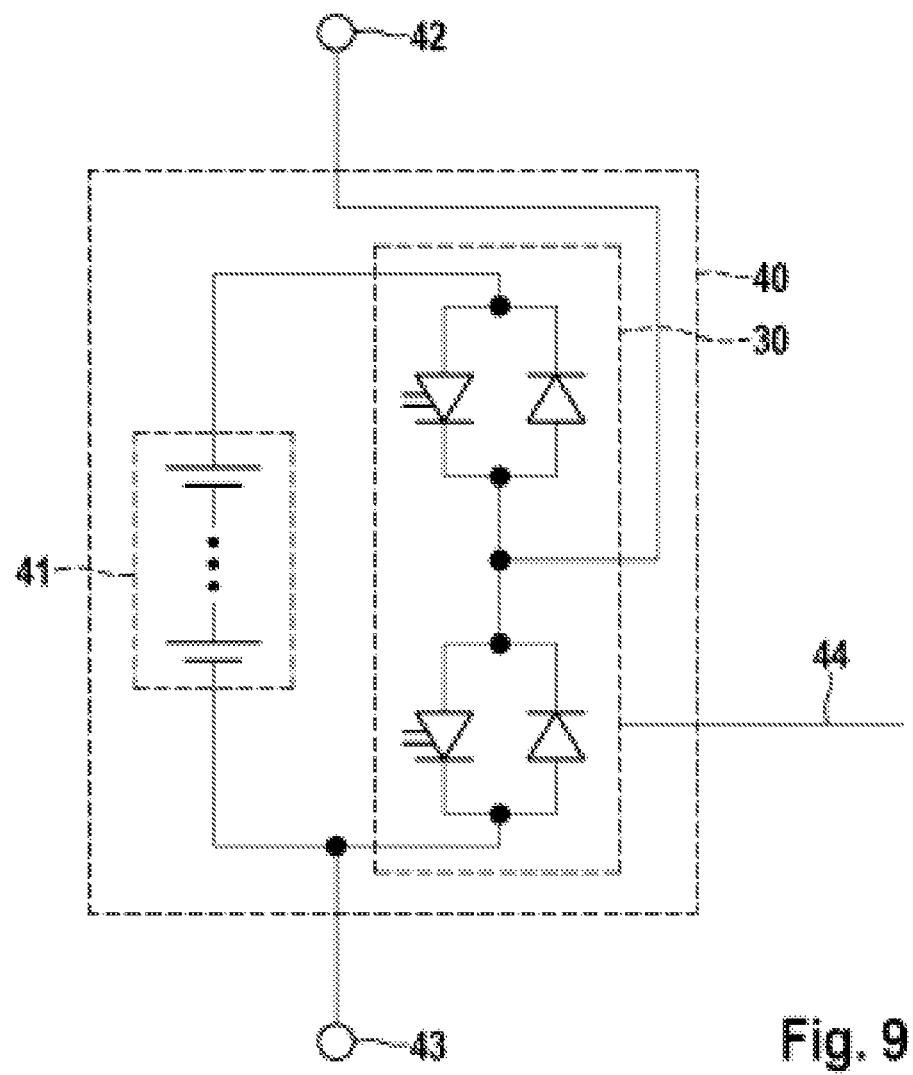
FIG. 9 shows the coupling unit illustrated in FIG. 6 in the arrangement illustrated in FIG. 7.

FIG. 9 shows the coupling unit 30 illustrated in FIG. 6 in the arrangement illustrated in FIG. 7. Actuation and diagnosis of the coupling units 30 takes place via a signal line 44, which is connected to a control device (not illustrated).

Figure 1:
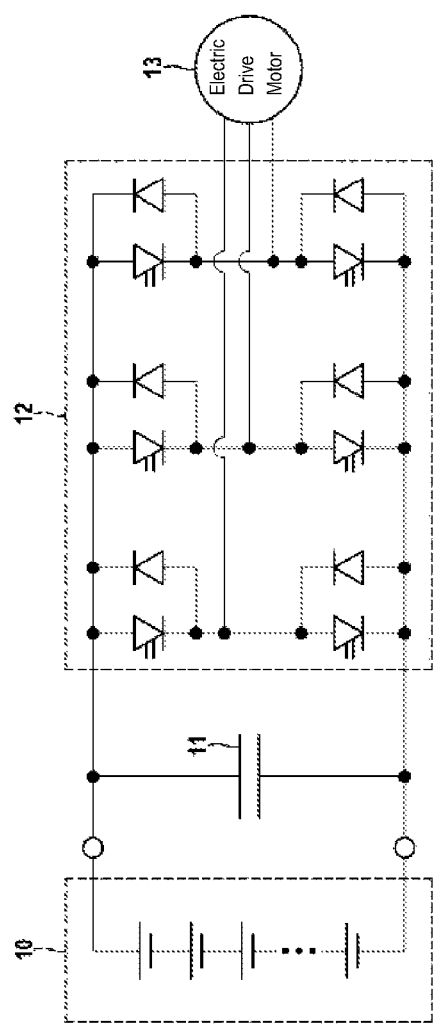
FIG. 1 shows an electric drive unit in accordance with the prior art.
Figure 2:
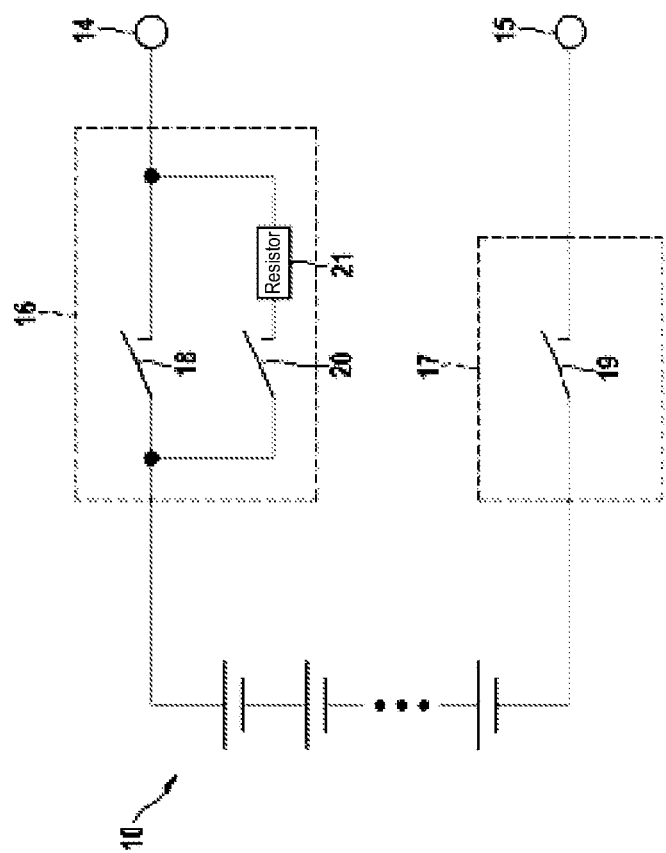
FIG. 2 shows a block circuit diagram of a battery in accordance with the prior art.
Figure 10:
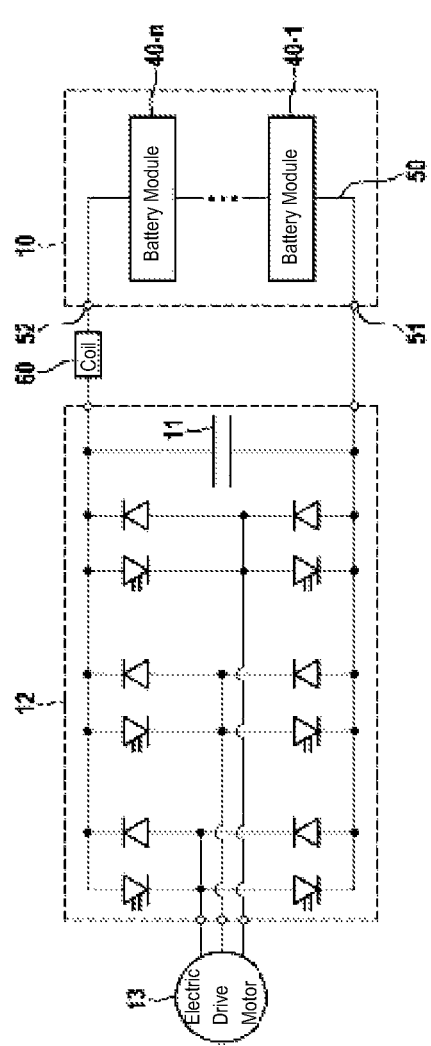
FIG. 10 shows an electric drive unit in which the method according to the disclosure can be implemented.

FIG. 10 shows an electric drive unit according to the disclosure with an electric motor 13, in which the method according to the disclosure can be implemented. As in FIG. 1, a battery 10 is connected to a DC voltage intermediate circuit, which is buffered by an intermediate circuit capacitor 11. A pulse-operated inverter 12, which supplies an electric drive motor 13, is connected to the DC voltage intermediate circuit. The disclosure provides for the battery 10 to comprise a battery module string 50, which comprises a plurality of series-connected battery modules 40-1, . . . , 40-n, which each comprise a coupling unit 30 and are constructed as illustrated in FIG. 7 or 8. When combining battery modules 40-1, . . . , 40-n to form the battery module string 50, in each case the first terminal 42 of a battery module 40-1, . . . , 40-n is connected to the second terminal 43 of an adjacent battery module 40-1, . . . , 40-n.

A negative pole 51 and a positive pole 52 of the battery module string 50 represent the taps of the battery 10. Owing to the fact that the battery modules 40-1, . . . , 40-n arranged between the taps each comprise coupling units 30, the output voltages which can be adjusted at the taps are adjustable stepwise.

A control unit (not illustrated) is designed to output a first control signal to a variable number of battery modules 40-1, . . . , 40-n, by means of which control signal the coupling units 30 of the battery modules 40-1, . . . , 40-n actuated in this way connect the battery cell (or the battery cells) 41 between the first terminal 42 and the second terminal 43 of the respective battery module 40-1, . . . , 40-n. At the same time, the control unit outputs a second control signal to the rest of the battery modules 40-1, . . . , 40-n, by means of which the coupling units 30 of these remaining battery modules 40-1, . . . , 40-n connect the first terminal 42 and the second terminal 43 of the respective battery module 40-1, . . . , 40-n, as a result of which the battery cells 41 of this battery module 40-1, . . . , 40-n are bridged.

By suitably actuating the plurality of battery modules 40-1, . . . , 40-n, different voltages can thus be output at the taps 51, 52 of the battery 10.

By suitably selecting the switching states of the coupling units 30, the voltage between the taps 51 and of the battery 10 can thus be adjusted stepwise between zero volt and a maximum value. The quantization steps in the adjustment of the output voltage correspond to the module voltages of the battery modules 40-1, . . . , 40-n and are thus dependent on the number of battery cells 41 in the battery modules 40-1, . . . , 40-n and the state of charge of the battery cells 41.

A coil 60 is connected between the intermediate circuit capacitor 11 and the battery 10. The inductance of the coil 60 can be selected to be relatively low since, owing to the use of the battery modules 40-1, . . . , 40-n, the voltage difference at the coil 60 and therefore also the current ripple are very low within a pulse period. Using pulse width modulation, the output voltage, present between the taps 51, 52, of the battery is adjustable substantially continuously, which is assumed in the following description of the method according to the disclosure.

Figure 11:
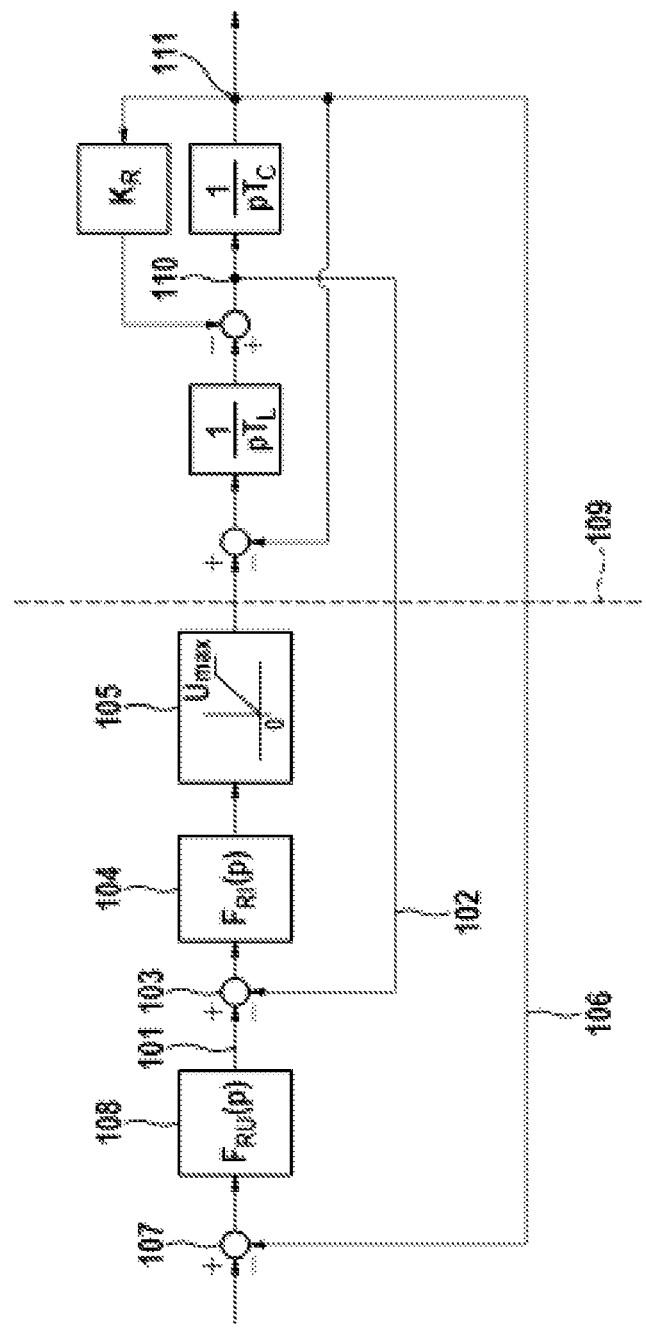
FIG. 11 shows a block circuit diagram of a system in which the method according to the disclosure is implemented.

FIG. 11 shows a block circuit diagram of a system comprising the battery 10, the coil 60 and the intermediate circuit capacitor 11, in which the method according to the disclosure is implemented. Transformation functions are specified in the various blocks, which result from Laplace transformation in the complex spectral range with complex variable p.

The method according to the disclosure for charging the intermediate circuit capacitor 11 comprises the following method steps: In method step 101, a setpoint value for the intermediate circuit current is fixed. In method step 102, an actual value for the intermediate circuit current is determined. In method step 103, a difference between the actual value and the setpoint value for the intermediate circuit current is formed, which forms the control difference for a current controller, which determines, in method step 104, an optimum output voltage of the battery 10 and outputs this output voltage as manipulated variable. The transformation function of the current controller is provided by the transformation function $F_{RI}(p)$. In method step 105, the optimum output voltage of the battery 10 is adjusted, wherein it is assumed that the output voltage is continuously adjustable, which can be achieved by suitable pulse width modulation.

If only the intermediate circuit current for charging the intermediate circuit capacitor 11 is intended to be controlled, the previously outlined current control loop is sufficient. The desired intermediate circuit current is input to said current control loop as setpoint value. If an intermediate circuit voltage at the intermediate circuit capacitor 11 has reached the output voltage of the battery 10, the current controller is deactivated, and the battery 10 is connected directly to the intermediate circuit capacitor 11 via the coil 60.

However, it is also possible to superimpose a further control of the intermediate circuit voltage which is present at the intermediate circuit capacitor 11 on the already outlined control of the intermediate circuit current. Thus, different intermediate circuit voltages can also be adjusted, for example for different driving situations in an electric vehicle.

This takes place by virtue of the fact that method steps 106 to 108 are introduced before method step 101, in which the setpoint value for the intermediate circuit current is fixed. In method step 106, an actual value for the intermediate circuit voltage is measured. In method step 107, a difference between the actual value and a setpoint value of the intermediate circuit voltage is determined and, in method step 108, this is converted into an optimum intermediate circuit current by means of a voltage controller with the transformation function $F_{RU}(p)$.

If a controlled voltage value is desired for the intermediate circuit voltage which is between the possible levels of the output voltage, the voltage controller used in method step 108 is continuously active. The voltage controller in this case continuously calculates a setpoint value for the subordinate current controller from the desired setpoint value for the intermediate circuit voltage.

The right-hand part of the block circuit diagram shown in FIG. 11 (to the right of the dashed line 109) describes the physical response of an electromagnetic resonance circuit which comprises the components coil 60 (transformation function $1/pT_L$), intermediate circuit capacitor 11 (transformation function $1/pT_C$) and a system resistor R (not known in more detail) (transformation function $K_R$). The effect of multiplying by the respective transformation functions is in this case that of converting a voltage into a current and, vice versa, a current into a voltage. In this case, the actual value for the intermediate circuit current is generated at the node 110. The actual value for the intermediate circuit voltage present at the intermediate circuit capacitor 11 is generated at the node 111. Both values are measured in method steps 102, 106.

The proposed method for charging an intermediate circuit capacitor requires only the coil 60 as additional hardware component. The actuation of the coupling units 30 arranged in the battery modules 40-1, . . . , 40-n can be realized via software functions in the control device (not illustrated). The actual values for the intermediate circuit current and the intermediate circuit voltage are typically detected for other reasons and are therefore available for the closed-loop control.

The invention claimed is:

1. A method for charging an intermediate circuit capacitor of an electric drive unit including an electric motor, comprising:
    charging the intermediate circuit capacitor with an intermediate circuit current provided by a battery having an output voltage configured to be adjusted to one of a plurality of voltage values, the battery including at least one battery module string with a plurality of battery modules connected in series, each battery module including at least one battery cell and a coupling unit, the at least one battery cell being connected between a first input and a second input for the coupling unit, the coupling unit being configured (i) to connect the at least one battery cell between a first terminal of the battery module and a second terminal of the battery module in response to a first control signal, and (ii) to connect the first terminal to the second terminal in response to a second control signal, as a result of which the output voltage of the battery is adjustable stepwise;
    fixing a setpoint value for the intermediate circuit current;
    determining an actual value for the intermediate circuit current;
    comparing the actual value for the intermediate circuit current with the setpoint value for the intermediate circuit current;
    determining an optimum output voltage of the battery based on the comparison of the actual value for the intermediate circuit current with the setpoint value for the intermediate circuit current; and
    adjusting the optimum output voltage of the battery.

2. The method as claimed in claim 1, wherein the method is implemented using a first controller configured to determine a manipulated variable provided by the optimum output voltage of the battery from a control difference between the actual value and the setpoint value for the intermediate circuit current.

3. The method as claimed in claim 1, wherein the setpoint value for the intermediate circuit current is fixed based on a comparison of an actual value for an intermediate circuit voltage which is present at the intermediate circuit capacitor with a setpoint value for the intermediate circuit voltage.

4. The method as claimed in claim 3, wherein the method is implemented using a second controller configured to determine a manipulated variable provided by the setpoint value for the intermediate circuit current from a control difference between the actual value and the setpoint value for the intermediate circuit voltage.

5. The method as claimed in claim 1, further comprising:
    charging the intermediate circuit capacitor via an inductance.

6. A control unit associated with an intermediate circuit capacitor of an electric drive unit including an electric motor comprising:
    a charging device configured to charge the intermediate circuit capacitor with an intermediate circuit current provided by a battery having an output voltage configured to be adjusted to one of a plurality of voltage values, the battery including at least one battery module string with a plurality of battery modules connected in series, each battery module including at least one battery cell and a coupling unit, the at least one battery cell being connected between a first input and a second input for the coupling unit, the coupling unit being configured (i) to connect the at least one battery cell between a first terminal of the battery module and a second terminal of the battery module in response to a first control signal, and (ii) to connect the first terminal to the second terminal in response to a second control signal, as a result of which the output voltage of the battery is adjustable stepwise;
    a fixing device configured to fix a setpoint value for the intermediate circuit current;
    a determining device configured to determining an actual value for the intermediate circuit current;
    a comparing device configured to compare the actual value for the intermediate circuit current with the setpoint value for the intermediate circuit current, wherein the determining device is further configured to determine an optimum output voltage of the battery based on the comparison of the actual value for the intermediate circuit current with the setpoint value for the intermediate circuit current; and
    an adjusting device configured to adjust the optimum output voltage of the battery.

7. A battery, comprising:
    a control unit configured to (i) determine an actual value for an intermediate circuit current used to charge an intermediate circuit capacitor in a drive unit including an electric motor, and (ii) to adjust an output voltage of a battery to one of a plurality of voltage values;
    at least one battery module string including a plurality of battery modules connected in series, each battery module having at least one battery cell and a coupling unit, and the at least one battery cell being connected between a first input and a second input of the coupling unit, and the coupling unit being configured (i) to connect the at least one battery cell between a first terminal of the battery module and a second terminal of the battery module in response to a first control signal, and (ii) to connect the first terminal to the second terminal in response to a second control signal, as a result of which the output voltage of the battery is adjustable stepwise,
    wherein the control unit is further configured to implement a method of charging the intermediate circuit capacitor,
    wherein the method includes
        charging the intermediate circuit capacitor with the intermediate circuit current provided by the battery,
        fixing a setpoint value for the intermediate circuit current,
        determining the actual value for the intermediate circuit current, comparing the actual value for the intermediate circuit current with the setpoint value for the intermediate circuit current, determining an optimum output voltage of the battery based on the comparison of the actual value for the intermediate circuit current with the setpoint value for the intermediate circuit current, and adjusting the optimum output voltage of the battery.

8. The battery of as claimed in claim 7, wherein the battery is included in a drive unit having an electric motor.

9. The battery as claimed in claim 8, wherein the drive unit is included in a motor vehicle and is configured to drive the motor vehicle.

* * * * *